United States Patent [19]

Hatch

[11] 4,314,171
[45] Feb. 2, 1982

[54] NARROW GAP COLLECTOR WITH INTEGRAL ELECTROMAGNETIC PUMP

[75] Inventor: Burton D. Hatch, Ballston Lake, N.Y.

[73] Assignee: General Electric Company, Schenectady, N.Y.

[21] Appl. No.: 126,043

[22] Filed: Feb. 29, 1980

[51] Int. Cl.³ .......................................... H02K 13/00
[52] U.S. Cl. .................................. 310/219; 310/178; 310/112; 310/114; 310/268
[58] Field of Search ................... 310/219, 62, 178, 63, 310/232, 112, 113, 127, 248, 268, 114; 417/50; 322/48; 339/56, 8 L

[56] References Cited

U.S. PATENT DOCUMENTS

| | | | |
|---|---|---|---|
| 3,211,936 | 10/1965 | Harvey | 310/219 |
| 3,546,508 | 12/1970 | Harvey | 310/219 |
| 3,585,398 | 6/1971 | Harvey | 310/178 |
| 3,989,968 | 11/1976 | Hatch | 310/219 |
| 4,027,183 | 5/1977 | Hatch | 310/219 |
| 4,027,184 | 5/1977 | Hurley | 310/178 |
| 4,146,807 | 3/1979 | Hatch | 310/219 |
| 4,168,446 | 9/1979 | Hatch | 310/219 |
| 4,186,321 | 2/1979 | Marshall | 310/178 |
| 4,207,486 | 6/1980 | Hatch | 310/178 |
| 4,241,272 | 12/1980 | Marshall | 310/219 |

OTHER PUBLICATIONS

Stevens et al., "Superconducting Machinery for Naval Strip Propulsion," IEEE, vol. MAG-13, No. 1, Jan. 1977.

Primary Examiner—R. Skudy
Attorney, Agent, or Firm—William H. Steinberg; James C. Davis, Jr.; Marvin Snyder

[57] ABSTRACT

A constant supply of liquid metal for a current collector of an acyclic machine is provided by passing armature current radially through a quantity of liquid metal disposed in an annular pumping channel formed between a compliant braided metal filament brush and the stator ring collector surface. A flow restricting plug causes pressure to develop in the circumferentially flowing liquid metal to maintain a constant film of liquid metal in contact with the rotor collector ring and the brush to complete electrical connection therebetween.

10 Claims, 9 Drawing Figures

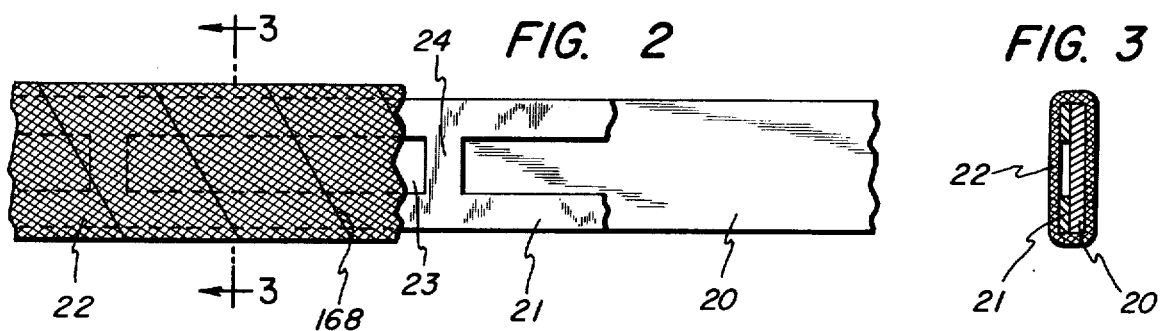
FIG. 2
FIG. 3
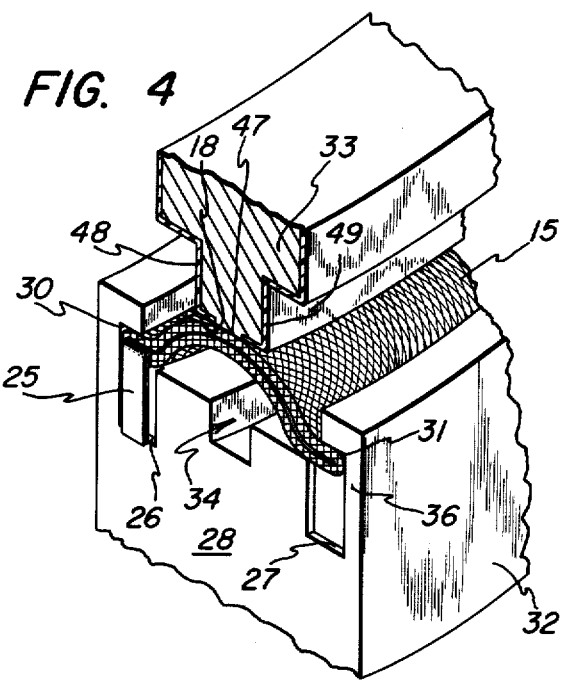
FIG. 4
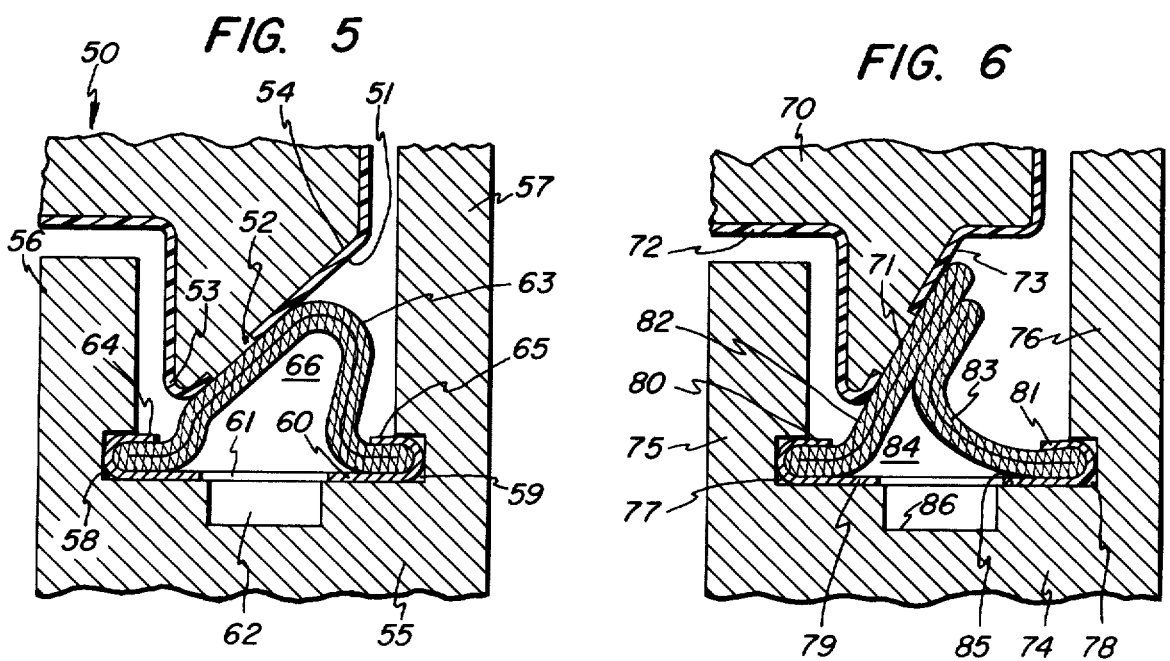
FIG. 5
FIG. 6

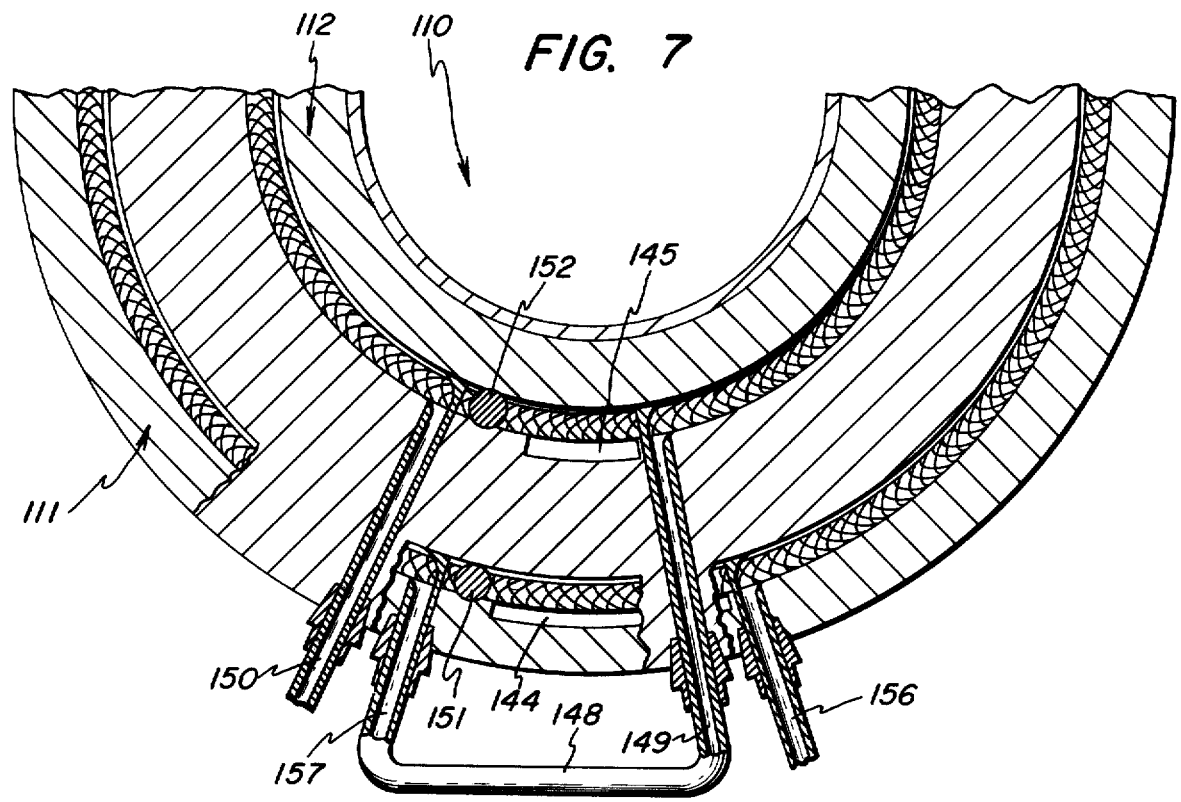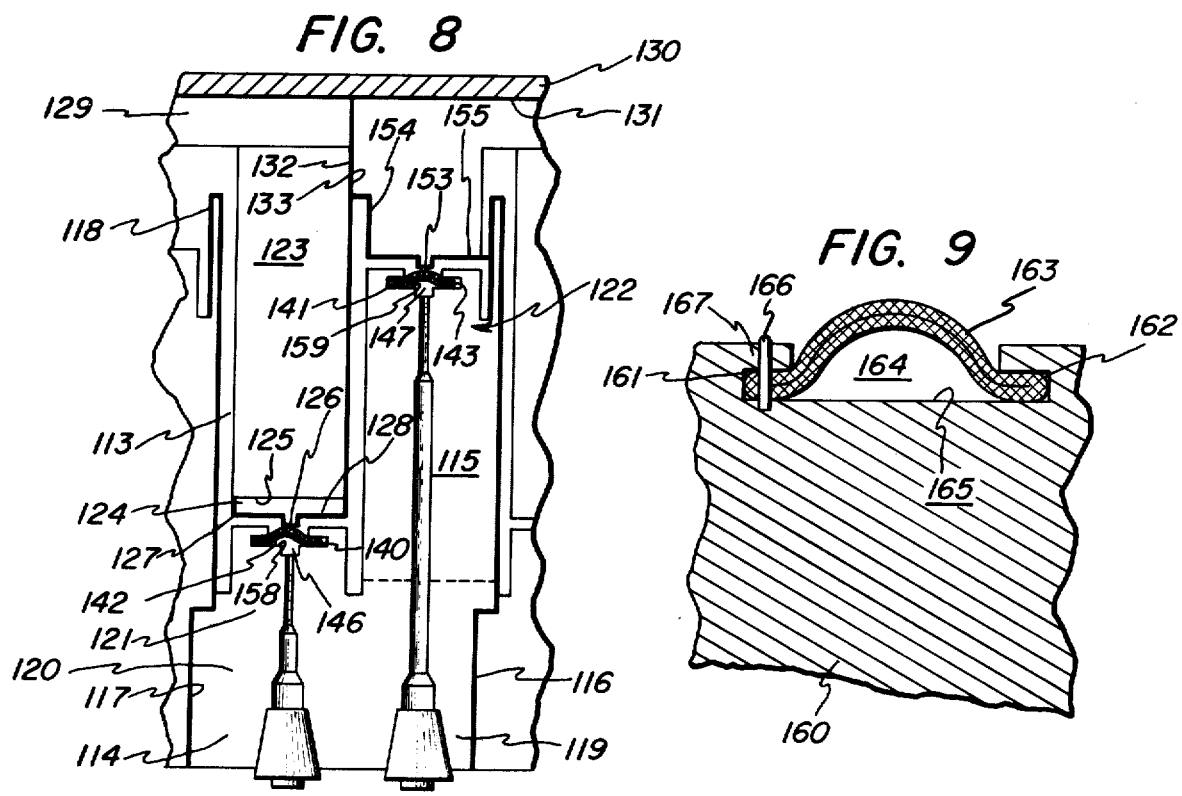

NARROW GAP COLLECTOR WITH INTEGRAL ELECTROMAGNETIC PUMP

BACKGROUND OF THE INVENTION

This invention relates to acyclic machines, and, more particularly, to such machines utilizing liquid metal current collectors for completing electrical connection between the relatively rotating rotor and stator members thereof. Such machines include the disk type acyclic machine as described in U.S. Pat. No. 3,585,398, issued June 15, 1971 to L. M. Harvey and assigned to the instant assignee, a disk/drum type acyclic machine as disclosed in my U.S. patent application Ser. No. 898,923, filed Apr. 21, 1978, now U.S. Pat. No. 4,208,600, and assigned to the instant assignee, and drum-type acyclic machines.

For high current density operation of acyclic machines, such as those employing superconducting field coils, it is necessary to provide a reliable high current-carrying capacity contact between rotor and stator members. In machines using liquid metal current collectors, this requires a constant reliable supply of liquid metal to the current collectors in order to continuously wet the contact surfaces and bridge the gap between the relatively rotating rotor and stator members. In a disk-type machine operating at high speed, centrifugal force tends to drive the liquid metal from the radially-inner current collectors. For both drum-type and disk-type machines operating at high speed, Lorentz expulsion forces tend to expel the liquid metal from the collectors. If the liquid metal is expelled from the current collectors, the collectors will run dry, in which condition the current collectors lack adequate current-carrying capacity to transmit the high current density produced in such machines, and arcing between current-carrying members may occur. Severe damage to the current-carrying contact surfaces of the relatively moving current collectors would quickly follow.

One approach to maintaining adequate liquid metal in the current collectors in high speed acyclic machines is described in my U.S. Pat. No. 4,027,183, issued May 31, 1977, and assigned to the instant assignee and in U.S. Pat. No. 4,027,184, issued May 31, 1977 to Hurley and assigned to the instant assignee. Each of these patents is drawn to localized circulation of liquid metal around a single current collector, which requires a large quantity of liquid metal in the gap separating the stator and the rotor. The relatively large quantity of liquid metal required for these current collectors creates relatively large viscous losses due to frictional contact between the rotor surfaces moving relative to the liquid metal in contact with the rotor, reducing machine efficiency.

In my earlier-filed U.S. patent application Ser. No. 924,055, filed July 12, 1978, now U.S. Pat. No. 4,207,486, and assigned to the instant assignee, a technique for producing liquid metal circulation within an acyclic machine is described, in which kinetic energy is imparted to liquid metal within the current collector by the rotating rotor collector ring. A scoop collects a portion of the circulating liquid metal, converts the kinetic energy into pressure, and supplies a pressurized flow of liquid metal through passages in each stator disk to a radially-inner current collector from a radially-outer current collector. A return flow path is provided within each stator disk to maintain continuous circulation of liquid metal between adjacent radially-inner and radially-outer current collectors.

In my prior-filed U.S. patent application Ser. No. 58,220, filed July 16, 1979, assigned to the instant assignee, and incorporated herein my reference thereto, a liquid metal current collector configuration is described which employs the integral electromagnetic pump concept to circulate liquid metal circumferentially about a pump groove within the stator disk to supply a continuous source of liquid metal around the current collector without requiring external machinery to pressurize the liquid metal. The pump groove was disposed in a stator collector ring so that a continuous supply of liquid metal could be provided to both inner and outer collector rings of a disk-type acyclic machine.

SUMMARY OF THE INVENTION

An object of the instant invention is to provide a current collector in which a thin film of liquid metal is maintained in contact with the rotor collector surface during high speed operation. Another object is to provide a current collector in which a braided metal filament brush is simply supported on the stator collector ring and maintained in close proximity to the rotor collector surface. A further object is to provide an easily constructed current collector with an integral pump channel within a simply supported braided metal filament brush to provide pumping of liquid metal about the current collector, and which requires no external pumping of liquid metal.

An integrally-pumped current collector as described herein includes a rotor collector ring and a stator ring collector surface surrounding and disposed in juxtaposition to the rotor collector ring; with a compliant braided metal filament brush extending circumferentially about the stator ring and disposed in an annular groove within the stator collector ring to form a liquid metal pumping channel between the stator ring collector surface and the braided metal filament brush, and a volume of liquid metal disposed in the space between the stator ring collector surface and the braided filament brush and forming a thin film contact between the rotor collector ring and the brush. In a particularly-preferred embodiment, a pumping channel is formed in said stator ring collector surface circumferentially about said stator ring and radially-outside said braided filament brush.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by reference to the following description taken in conjunction with the accompanying drawings in which:

FIG. 2 is a schematic partial cross-sectional view of a compliant braided metal filament brush for use in the current collector illustrated in FIG. 1;

FIG. 3 is a cross-sectional view of the braided filament brush of FIG. 2 taken along line 3—3 thereof;

FIG. 4 is a pictorial schematic partial cross-sectional view of a current collector of the instant invention;

FIG. 5 is a schematic partial cross-sectional view of an alternate embodiment of the instant invention;

FIG. 6 is a schematic partial cross-sectional view of an alternate embodiment of the instant invention;

FIG. 7 is a schematic partial cross-sectional view of a disk-type acyclic machine incorporating current collectors designed according to the instant invention;

FIG. 8 is a schematic partial cross-sectional view of a disk-type acyclic machine incorporating the current collector configuration of the instant invention; and FIG. 9 is a schematic partial cross-sectional view of a stator ring collector showing a particular brush attachment arrangement.

DESCRIPTION OF THE PREFERRED EMBODIMENTS

Figure 1:
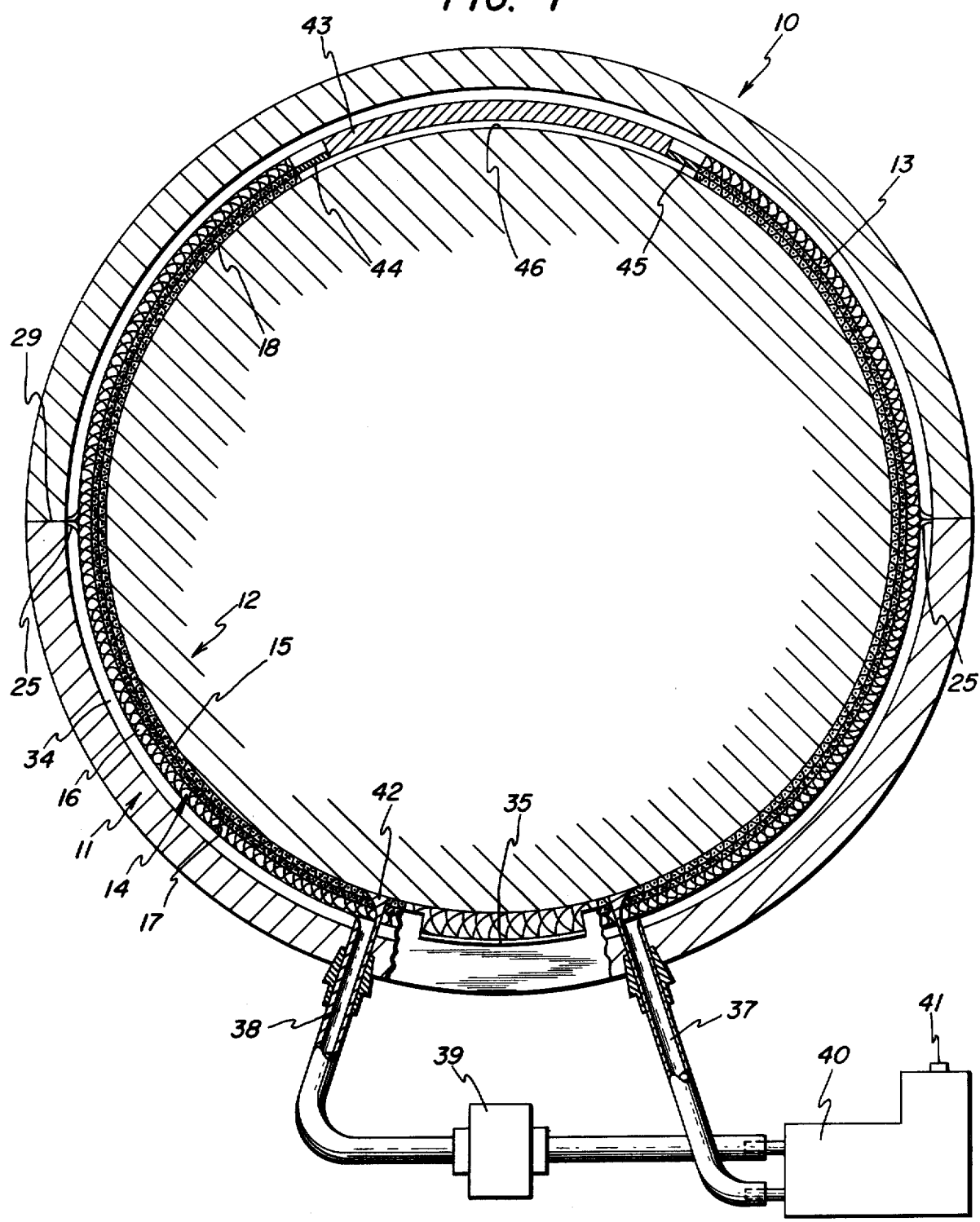
FIG. 1 is a schematic partial cross-sectional view of an acyclic machine incorporating the liquid metal current collector constructed according to the instant invention.

The specific features of the instant invention described herein and shown in FIGS. 1-9 are merely exemplary, and the scope of the invention is defined in the appended claims. Throughout the description and FIGS. 1-9, like reference characters refer to like elements of the invention.

A partial cross-sectional view of a current collector of the instant invention is shown in FIG. 1. The machine 10 comprises a stator 11 and a rotor 12 rotatable with respect to stator 11, and separated therefrom by an annular gap 13. Bearings (not shown) are provided to maintain the gap 13 between stator 11 and rotor 12 to assure adequate mechanical clearance, and, in the instant invention, to provide space for liquid metal current collectors 14 between stator 11 and rotor 12. Collector 14 includes a compliant braided metal filament brush 15, which is disposed in gap 13, such that an open annular channel 16 is provided between the braided filament brush 15 and the stator ring collector surface 17, which extends completely around the circumference of the stator ring collector surface 17. A volume of liquid metal, e.g., sodium-potassium eutectic, NaK, is disposed in the channel 16, between the brush 15 and surface 17, and under pressure passes through the interstices in the brush 15 to form a thin film between the brush 15 and the radially outer surface 18 of the rotor collector ring, completing electrical connection therebetween.

One technique of manufacturing the brush 15 is shown in FIGS. 2 and 3. A mandrel 20 of appropriate material and dimensions (e.g., an aluminum strip 1/16"×½"), and a support strip 21 are placed together and a strip 22 of conductive braided metal filament wire is wrapped helically about mandrel 20 and strip 21 to form the brush 15. After the braid is wrapped about mandrel 20 and support strip 21, the brush is flattened to form sharper bends at the lateral edges of mandrel 20, and mandrel 20 is removed. The resultant brush having a support strip and helically wound braided metal filament mesh is then formed over a generally circular bar to produce a flexible arch shape for insertion into current collector 14 of FIG. 1. The support strip 21 may be a strip of steel, stainless steel, copper, aluminum or other suitable material of such composition as to be plastically, compliant, so that the overall brush may deform readily to take the shape required to maintain a narrow gap configuration. Typical dimensions of strip 21 are 0.010 inch thick and 0.5 inch wide. The support strip 21 preferably comprises a ladder-type structure with a series of slots 23 separated by rungs 24 and dimensioned such that the circumferential length of the slots 23 when in a current collector is at least three times, and preferably ten times, the circumferential length of the rungs 24. The axial, relative to the axis of machine 10, length of the slots 23 would be selected so that adequate cross section of liquid metal flow through the support strip is provided, while, simultaneously, the amount of leakage of liquid metal from channel 16 is kept to a minimum.

Brush 15 as described above is installed in current collector 14 as shown in FIG. 1 by clamping tabs 25 into slots 26, respectively, formed in the end face 28 of the stator ring halves as shown in FIG. 4. As can be seen in FIG. 1, the tabs 25 from two separate semi-circular brushes are clamped together at the joint 29 between the two stator ring halves. This frictionally secures the strips 21, and thereby prevents circumferential shifting of the support strip 21 and braided brush 15 during operation of the machine. As can be seen in FIG. 4, brush 15 forms a flexible arch with the ends secured in slots 30, 31 in stator collector ring 32. Pumping channel 16 includes groove 34 formed in the stator ring collector surface 17, and provides for electromagnetic pumping of liquid metal circumferentially about the collector 14 as described in the above-mentioned U.S. Patent application Ser. No. 58,220. Although the brush 15 is shown in contact with the rotor collector ring 33, in fact, a narrow radial gap of approximately 0.002 inch, created by plastic deformation of brush 15, radially separates brush 15 from the rotor collector ring surface 18. Rotor collector ring surface 18 includes narrow annular rotor contact surface 47 with adjacent surfaces 48, 49 of electrically insulating material, such as sprayed alumina.

Brush 15 and the enclosed ring of liquid metal is disposed immediately radially-outward from the rotor collector ring surface 18, and is directly in the path of flow of electrical armature current between annular rotor contact surface 47 and the stator ring collector surface 17 at each current collector site. The reactions of the radial flow of a portion of the armature current passing through each element of the liquid metal disposed within the annular pumping channel 16 with the axial portion of the magnetic flux from the field coils passing through the same element of liquid metal produce circumferential forces which tend to move (i.e., pump) the element of liquid metal circumferentially around the periphery of the current collector. The total effect upon the liquid metal disposed within the pumping channel is a continuous replenishment of liquid metal through the interstices between the wires in the braided filament brush to the narrow gap between the rotor contact surface 47 and brush 15.

The continual flow of liquid metal out of pumping channel through the porous brush, as well as the collection by gravitational settling of the liquid metal to the bottom of the machine, when not operating, requires that some means be provided to return liquid metal to the pumping channel from the region adjacent the rotor collector ring. A liquid metal resupply slot 35, as shown in FIG. 1, is provided for this purpose. Slot 35 is formed by removing the shoulder 36, see FIG. 4, from a circumferential portion of the stator ring down to the level of the stator ring collector surface 17, thereby leaving the edge of brush 15 unsupported over the circumferential length of the resupply slot 35. This allows a radial gap to exist between the axial edge brush 15 and stator ring collector surface 17, so that liquid metal may be drawn into pumping groove 16 to be recirculated by the elcetromagnetic pumping described above.

As shown in FIG. 1, an inlet path 37 and an outlet path 38 are disposed in the stator collector ring 32 adjacent the resupply slot 35. A flow control valve 39 is located in the outlet path 38, so that flow of liquid metal from the collector may be prevented or restricted thereby. A closed loop liquid metal recirculation reservoir 40 is connected to the inlet passage 37 and the outlet passage 38. Reservoir 40 supplies an extra quantity of liquid metal if required, and by controlling through inlet 41, the pressure of the inert cover gas disposed above the liquid metal stored in reservoir 40, the quantity and level of liquid metal inside the collector may be set to provide a minimum quantity required to provide completely reliable, continuous collector performance. By so controlling the liquid metal quantity that only the minimum is provided to the current collector, the viscous drag losses are kept to the minimum possible, and therefore maximum efficiency consistent with the desired collector reliability is achieved.

In a drum-type machine having a plurality of current collectors, or in a disk-type machine having a plurality of disks and a plurality of current collector pairs, the actual quantity of liquid metal at each collector site may be established by the configuration shown including the reservoir 40 and a supply of cover gas pressure for each reservoir. Thereby, separate quantities and pressures of liquid metal may be provided to the separate current collectors. In machine designs with a fixed stator adjacent pairs of collectors are at different electrical potential. Electrical separation of the fluid stream (or liquid metal particles thereof) in each pair of collectors at a given voltage from any adjacent collector pair is required. This separation may be provided by using one small liquid metal reservoir per pair of collectors with a common inert cover gas supply connected by pipes of insulating material to each of the reservoirs to simultaneously establish in each pair of collectors and each reservoir the appropriate pressure to maintain the desired amount of liquid metal in each active collector gap. The size of reservoir 40 can be selected to provide a suitably long operational life, as determined by the time between replacement of the liquid metal in the complete system required by oxidation of the liquid metal over a period of time. A blocking key 42 is disposed in the current collector to provide a flow limiting device as well as an outlet for liquid metal recirculation to reservoir 40.

As shown in the upper part of FIG. 1, the braided metal filament may be provided over only selected portions of the circumference of the rotor collector surface. Over unused lengths of the current collector circumference, a filler strip 43 may be placed between adjacent collector braid strip support keys 44, 45 to provide a running clearance 46 between the rotor collector surface 18 and the filler strip 43. Liquid metal is effectively expelled from the gap 46 by high speed fluid dynamics of the liquid metal in the clearance space. Using this construction, the viscous drag on the rotor may be reduced by reducing the total of the circumferential collector lengths to provide the minimum cross-sectional area of liquid metal to rotor collector interface necessary to provide adequate current-carrying capacity for the particular machine employed.

FIG. 5 illustrates an alternative embodiment of the brush configuration of the instant invention. As shown in FIG. 5, the rotor collector ring 50 has a contact surface 51 at an acute angle to the machine axis. Annular contact area 52 is bounded by adjacent areas 53, 54 of insulating coating, e.g., sprayed alumina, so that electrical current may pass only through the contact area 52. The stator collector ring 55 has two shoulders 56, 57 having grooves 58, 59 therein, respectively, for receiving a brush clamping strip 60. Strip 60 is made of copper or other suitable conductive material and has a series of circumferentially-spaced openings 61 for passage of liquid metal therethrough, and a groove 62 cut in the stator ring 55. A compliant braided metal filament brush 63, formed similarly as described above, is inserted into the edges 64, 65 of the clamping strip 60, which are then rolled over to firmly clamp brush 63. Strip 60 and brush 63 are then inserted into stator grooves 58, 59. When brought into contact with the contact area 52 of the rotor collector, the braid deforms plastically to take the shape of contact area 52. The annular space 66 between the brush 63 and the stator ring 55 and including groove 62 is filled with liquid metal, which is pumped electromagnetically as described above to supply a continuous source of liquid metal about the circumference of the current collectors.

In FIG. 6, a configuration similar to that shown in FIG. 5 is illustrated. A rotor collector ring 70 having a narrow contact area 71 bounded by insulation layers 72, 73 is disposed in juxtaposition to stator collector ring 74. The stator collector ring 74 has shoulders 75, 76 with grooves 77, 78, respectively, disposed therein for receiving a brush clamping strip 79. Strip 79 has edges 80, 81 into which two separate compliant braided metal filament brushes 82, 83 are clamped, respectively, by rolling edges 80, 81 over an edge of each of the respective brushes. In this configuration, the brush 83 serves to bias the brush 82 against the contact area 71 of the rotor collector ring 70. Electromagnetic pumping of liquid metal disposed in the annular space 84 bounded by the two brushes 82, 83 and the bottom surface 85 and groove 86 of the stator collector ring is provided as described above.

FIGS. 7 and 8 illustrate an embodiment of the instant invention for disk-type acyclic machines. The machine 110 comprises a stator 111, rotor 112, rotatable with respect to stator and separated therefrom by a gap 113. Stator 111 includes a plurality of stator collector rings 114 made of conductive material, such as copper, and fastened together by bolts or similar support means (not shown). Attached to each stator collector ring 114 by electron-beam welding or other suitable technique is a stator disk 115, made of electrically-conductive material, usually copper or its alloys, or iron or its alloys. Adjacent stator collector rings 114 are electrically insulated from each other by a layer 116 of insulating material, such as sprayed alumina. The layer 116 of insulating material extends along one axial side 117 of each stator disk 115 and over projection 118 to prevent shorting between adjacent stator and rotor disks. Each stator collector ring 114 is configured to provide a disk mounting portion 119 and a current collector support portion 120. A current collector 121 is mounted on the current collector support portion 120 and another current collector 122 is provided at the radially-inner portion of the stator disk 115.

Rotor 112 comprises a plurality of concentric rotor disks 123, usually made of copper, copper alloy, iron or iron alloy, interleaved with said plurality of stator disks 115. If the rotor disks are made of iron or iron alloy, a conductive rotor collector ring 124 will be attached by electron beam welding or other suitable technique to the radially-outer surface 125 of each rotor disk 123.

The conductive rotor collector ring 125 is usually made of copper or a copper alloy, and has a narrow annular contact area 126 for making electrical contact with a juxtaposed conductive brush mounted on a stator collector ring. Adjacent annular contact area 126 are two annular rings 127, 128 of insulating material, such as sprayed alumina, to prevent electrical current from passing through portions of the contact ring other than the annular contact area 126. Rotor disks 123 are mounted on conductive rings 129, usually made of copper or a copper alloy, affixed to a hollow rotor shaft 130, usually made of steel or other suitable alloy, and insulated from the mounting rings 129 by a layer 131 of insulating material such as sprayed alumina. A layer 132 of insulating material such as sprayed alumina is applied to one axial side 133 of the mounting disk 129 and rotor disk 123 to prevent electrical current from passing between the rotor disks and stator disk. Radially inner collector 122 includes annular rotor contact area 153 bounded by insulating coating rings 154, 155.

As can be seen in FIG. 8, a pair of compliant brushes 140, 141 are mounted in support grooves 142, 143, respectively, to make electrical contact with the respective annular rotor contact areas 126, 153. Annular pumping channels 146, 147 located between brushes 140, 141 and stator ring collector surfaces 158, 159, respectively, are filled with a volume of liquid metal, which is pumped circumferentially about the current collectors as described above. As shown in FIG. 7, each of the inner and outer current collectors 121, 122 has a resupply slot 144, 145, respectively, to allow liquid metal, which has escaped through the interstices between the filaments of the brush to return to the pumping channels 146, 147, respectively. As also shown in FIG. 7, a single supply and outlet combination may be provided for a pair of current collectors in a stator collector ring. An inlet passage 156 is provided to supply liquid metal to the radially-outer current collector 121 and an outlet passage 157 from the radially-outer current collector 121 is connected via conduit 148 ot inlet 149 to the radially-inner current collector 122 associated with the same stator collector ring 114 as collector 121. Liquid metal which escapes through the interstices in the radially-inner brush 114 and passes along the sides of the rotor and stator disks will be pumped by centrifugal force toward radially-outer current collector 121. Outlet passage 150 is connected to a liquid metal reservoir as shown in FIG. 1. The blocking plugs 151, 152 will partially or completely prevent flow of liquid metal circumferentially, so that a pressure control may be maintained in the liquid metal in each current collector 121, 122, respectively. After the current collectors 121, 122 have been filled with an adequate supply of liquid metal, the supply and outlet passages may be closed by suitable valves (not shown) and the machine run as a batch-filled machine without external resupply circulation and resupply thereof. As described above, a single inert cover gas supply may be used with appropriate electrical isolation between adjacent stator collector rings.

FIG. 9 illustrates a technique of fastening a compliant braided metal filament brush into a pumping groove if positive attachment is required. A stator collector 160 has a pair of grooves 161, 162 formed therein, in which a compliant braided metal filament brush 163 is disposed forming a pumping channel 164 between the brush 163 and the stator collector surface 165. A plurality of pins 166 are inserted through the shoulder 167 and through the brush 163 and seated in the surface 165 of the stator collector 160 to maintain the position of brush 163 within groove 161. This configuration will securely position brush 163 and prevent shifting of brush 163 or of the filamentary material wrapped around the support strip by friction or electromagnetic forces. In the configuration shown in FIG. 1 with the tabs clamped between stator halves, the brush will be placed in tension in the circumferential direction by the electromagnetic torque on the briad generated by the interaction of armature current passing radially through the brush and the flux from the field coil passing generally axially through the brush. This is the same force which is employed to pump the liquid metal circumfernetially about the pumping channel within the collector brush. This torque may tend to cause separation of the adjacent wraps of the helically-wrapped braid at the interface 168 between adjacent wraps (see FIG. 2). Further, the initial rubbing contact between the rotor collector surface and the brush at initial assembly of the machine may also cause a force to be exerted upon the brush tending to create separation of adjacent wraps of the helically-wrapped brush. The support strip will carry the electromagnetic torque applied to the filament brush, but over a long running time adjacent wraps of the braided metal filament brush may tend to separate unless they are secured in position. The pin 166, as shown in FIG. 9, may be used to secure a number of wraps of filament braid in position, so that the braid does not separate.

The dimensions of the pumping channel under any of the brush configuration described herein can be selected to provide adequate torque upon the liquid metal, such as sodium potassium eutectic, NaK, to provide uniform distribution of the liquid metal about the circumference of the machine. A groove, such as groove 34, in FIG. 1, in the stator collector surface may be employed to increase the pumping channel cross section if required for a particular machine configuration, or the flat collector surface 165 as shown in FIG. 9 may be employed if adequate pumping channel cross section is provided thereby.

The invention described herein may be employed with a variety of current collector configurations. For example, each of the integral pump current collector constructions described herein may be employed with drum-type acyclic machines or disk-type acyclic machines. The integral pumped supply arrangement may be employed for current collectors as described in U.S. patent application Ser. No. 924,055, filed July 12, 1978, now U.S. Pat. No. 4,207,486, and assigned to the instant assignee, the filament brush structure as described in U.S. Pat. No. 4,186,321, issued to R. A. Marshall, Jan. 20, 1980 and assigned to the instant assignee, or the current collector configuration described in U.S. patent application Ser. No. 934,100, now U.S. Pat. No. 4,241,272, filed Aug. 16, 1978 by Marshall and assigned to the instant assignee. The instant invention provides a readily-manufactured, reliable liquid metal distribution technique for high current density collectors for acyclic machines requiring a minimum liquid metal to rotor collector interface and at the same time maintains adequate liquid metal to rotating surface contact area, so that machine efficiency may be raised to its maximum possible level consistent with reliable current transmission between rotor and stator collector surfaces.

I claim:

1. An integrally pumped current collector for an acyclic machine comprising:

- a rotor collector ring having an annular rotor contact surface thereon;
- a stator collector ring surrounding and disposed in juxtaposition to said rotor collector ring and having a stator ring collector surface in juxtaposition to said rotor contact surface; and said stator ring having an annular groove adjacent said stator ring collector surface;
- a compliant braided metal filament brush extending circumferentially about said stator ring collector surface; said brush being disposed in said annular groove such that said brush and said stator ring collector surface define an annular liquid metal pumping channel extending about the circumference of said stator ring collector surface and including an annular groove formed in said stator ring collector surface; said brush being disposed in close radial proximity to said rotor collector surface and separated therefrom by a narrow annular gap;
- an inlet passage in flow communication with said pumping channel and an outlet passage in flow communication with said pumping channel; said inlet passage and said outlet passage each being in flow communication with a liquid metal reservoir; said liquid metal reservoir containing a quantity of liquid metal and an inert cover gas; said cover gas being maintained at a predetermined gas pressure;
- at least one flow restricting plug disposed in said pumping channel circumferentially beyond said outlet passage in the direction of liquid metal pumping;
- a liquid metal resupply slot disposed between said inlet and outlet passages for return flow of liquid metal to said pumping channel from the area adjacent said stator collector ring; and
- a volume of liquid metal disposed in said pumping channel, and filling said narrow annular gap.

2. The current collector of claim 1, wherein said brush comprises a braided mesh of conductive wires helically wrapped around a support strip of plastically deformable electrically conductive metal; said support strip comprising a thin metal strip having a ladder structure, such that the openings between rungs allow passage of liquid metal therethrough into the interstices between the filaments of said brush; and said brush is shaped into a flexible arch having the center of its convex surface disposed in close radial proximity to said rotor contact surface.

3. The current collector of claim 2, wherein said brush is secured into said annular groove by a plurality of circumferentially spaced pins inserted through said brush and into said stator ring collector surface.

4. The current collector of claim 2, wherein tabs of said support strips are frictionally secured to said stator ring.

5. The current collector of claim 1 wherein said brush comprises a braid of compliant conductive metal filaments secured in a conductive metal fastening clip; and said clip and said braid are disposed in said annular groove in said stator ring.

6. The current collector of claim 1, wherein said brush comprises a pair of compliant braided metal filament strips; each of said strips being secured in opposed edges of a conductive metal fastening clip; said braided filament strips being disposed against each other such that one of said strips is biased toward said rotor contact surface.

7. The current collector of claim 5, wherein said rotor contact surface forms an acute angle with the machine axis.

8. In an acyclic electrodynamic machine comprising: a hollow shaft mounted for rotation about an axis; a plurality of annularly-shaped electrically conductive rotor disks each mounted concentrically with said shaft and connected thereto by an electrically conductive rotor disk mounting ring; a first electrically conductive rotor collector ring surrounding and attached to the outer circumferential surface of each of said rotor disks; a plurality of annularly-shaped electrically conductive stator disks interleaved with said rotor disks; each of said stator disks being mounted concentrically within one of a plurality of electrically conductive stator mounting rings; each of said stator mounting rings having a first annular stator collector ring formed thereon and disposed circumferentially around one of said first rotor collector rings; each of said rotor disk mounting rings having an annularly-shaped portion extending in the axial direction radially-inwardly of a stator disk, and constituting a second rotor collector ring; a second annular stator collector ring formed on the radially-inner surface of each of said stator disks and disposed circumferentially around one of said second rotor collector rings; a current collector combination comprising:

- an annular rotor collector contact surface on each of said first and second rotor collector rings;
- a stator ring collector surface on each of said first and second stator collector rings in juxtaposition, respectively, with the rotor collector contact surface of one of said first and second rotor collector rings; and each of said stator collector rings having an annular groove adjacent said stator ring collector surface;
- in each stator collector ring a compliant braided metal filament brush extending circumferentially about the stator ring collector surface; said brush being disposed in said annular groove such that said brush and said stator ring collector surface define an annular liquid metal pumping channel extending about the circumference of said stator ring collector surface and including an annular groove formed in said respective stator ring collector surface; said brush being disposed in close radial proximity to a respective one of said rotor collector surfaces and separated therefrom by a narrow annular gap;
- each pumping channel having an inlet passage and an outlet passage in flow communication therewith;
- at least one flow restricting plug disposed in each said pumping channel circumferentially beyond said outlet passage in the direction of liquid metal pumping;
- a liquid metal resupply slot in each said pumping channel disposed between said respective inlet and outlet passages for return flow of liquid metal to said pumping channel from the area adjacent the respective stator collector ring; and
- a volume of liquid metal in each of said pumping channels filling a respective one of said narrow annular gaps.

9. The current collector combination of claim 8 wherein an outlet passage in flow communication with the pumping channel of each one of said first stator collector rings is connected in flow communication with an inlet passage in flow communication with the pumping channel of the second stator collector ring disposed in the stator disk attached to said one of said first stator collector rings; an inlet passage in flow communication with said pumping channel of said one of said first stator collector rings; and an outlet passage in flow communication with said pumping channel of said second stator collector ring being in flow communication with a liquid metal reservoir; said liquid metal reservoir containing a qunatity of liquid metal and a quantity of an inert cover gas; said cover gas being maintained at a predetermined gas pressure.

10. The current collector combination of claim 9 wherein each said brush comprises a braided mesh of conductive wires helically wrapped around a support strip of plastically deformable electrically conductive metal; said support strip comprising a thin metal strip having a ladder structure, such that the openings between rungs allow passage of liquid metal therethrough into the interstices between the filaments of said brush; and said brush is shaped into a flexible arch having the center of its convex surface disposed in close radial proximity to said respective rotor contact surface.

* * * * *